United States Patent [19]

Klören

[11] 3,998,563
[45] Dec. 21, 1976

[54] DETACHABLE COUPLING DEVICE

[75] Inventor: Ulrich Klören, Krefeld, Germany

[73] Assignee: Ringfeder G.m.b.H., Krefeld-Uerdingen, Germany

[22] Filed: Apr. 28, 1975

[21] Appl. No.: 572,299

[30] Foreign Application Priority Data

July 15, 1974 Germany .................... 7423987[U]

[52] U.S. Cl. .............................. 403/370; 403/374
[51] Int. Cl.² .......................................... F16D 1/06
[58] Field of Search .......... 403/370, 371, 374, 366, 403/368

[56] References Cited

UNITED STATES PATENTS

| 827,346 | 7/1906 | Bubb | 403/371 |
|---|---|---|---|
| 2,691,541 | 10/1954 | Benedek | 403/370 |
| 3,679,247 | 7/1972 | Peter et al. | 403/366 |
| 3,717,367 | 2/1973 | Peter et al. | 403/366 |
| 3,782,841 | 1/1974 | Winckelhaus | 403/370 X |

FOREIGN PATENTS OR APPLICATIONS

| 1,095,064 | 1/1965 | Germany | 403/370 |
|---|---|---|---|
| 1,099,806 | 2/1961 | Germany | 403/370 |

*Primary Examiner*—Andrew V. Kundrat
*Attorney, Agent, or Firm*—Michael J. Striker

[57] ABSTRACT

A detachable coupling device has radially spaced outer and inner concentric rings mounted on a shaft. A pair of axially spaced clamping rings have surface portions which are partially received within the interior spaces formed by the circumferential surfaces of the outer and inner rings. Clamping screws draw the clamping rings together, causing the rings to thereby generate a radial clamping force on the shaft.

8 Claims, 4 Drawing Figures

DETACHABLE COUPLING DEVICE

BACKGROUND OF THE INVENTION

The present invention relates to a detachable coupling device, and more particularly to a coupling device which couples a rotatable element to a high torque transmission drive means.

In the prior art, clamping devices are known which couple a cylindrical member or shaft to a concentrically arranged support. The known clamping devices mount symmetrical inner and outer rings on the cylindrical member. However, the radial clamping force achieved by drawing the inner and outer rings together by means of axially spaced clamping rings has been found to be unsatisfactory, especially when it is desired to rotate the cylindrical member by connecting the clamping device to a high-torque rotatable transmission drive.

In the clamping devices of the prior art, the problem of slippage occurs between the shaft and the clamping device. In order to provide for a more affirmative clamping action, the prior art has proposed utilizing a plurality of clamping devices axially spaced along the shaft. This approach has the disadvantage of being costly as well as the further disadvantage of requiring complex linkage systems to simultaneously drive each of the clamping devices.

Alternatively, the prior art has proposed utilizing clamping devices which have corrugated engaging surfaces to embrace the shaft. The interengagement of these corrugations on the shaft has been found to be unsatisfactory in that it leads to shearing and premature destruction of the corrugations, as well as their non-uniform cooperation with the shaft.

SUMMARY OF THE INVENTION

Accordingly, it is a general object of the present invention to overcome the disadvantages of the prior art.

More particularly, it is an object of the present invention to provide a coupling device which affirmatively clamps a rotating shaft element.

Another object of the present invention is to prevent slippage without requiring a plurality of additional axially spaced coupling devices.

A further object of the present invention is to provide interchangeable coupling devices.

In keeping with these objects and others which will become apparent hereinafter, one feature of the present invention is to provide an inner ring having a contoured outer circumferential surface positioned about a rotatable element, such as a shaft. An outer ring having a larger diameter than the inner ring is radially spaced of the latter and has a contoured inner circumferential surface which defines with the contour of the outer circumferential surface of the inner ring, a pair of axially spaced V-shaped recesses which converge towards each other. Furthermore, the outer ring has a larger cross-sectional area in axial section than the inner ring.

A pair of axially spaced generally V-shaped clamping rings have surface portions which will wedge against the walls of the V-shaped recesses when a plurality of clamping screws are rotated in requisite direction to effect the drawing together of the clamping rings. The wedging action generates a radial force on the shaft, as will be described in greater detail below.

The larger axial cross-sectional area of the outer ring causes a correspondingly more affirmative clamping force on the shaft than is provided by the clamping devices of the prior art, and thereby overcomes the prior art slippage problem without requiring a plurality of additional clamping devices.

In addition, the larger cross-sectional area of the outer rings allows the outer peripheral region thereof to be modified so as to be coupled to a high torque transmission drive means. Moreover, the variously modified outer circumferential regions permit the circumferentially complete outer rings to be interchanged depending upon the loading and high-torque transmission requirements required by the drive system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
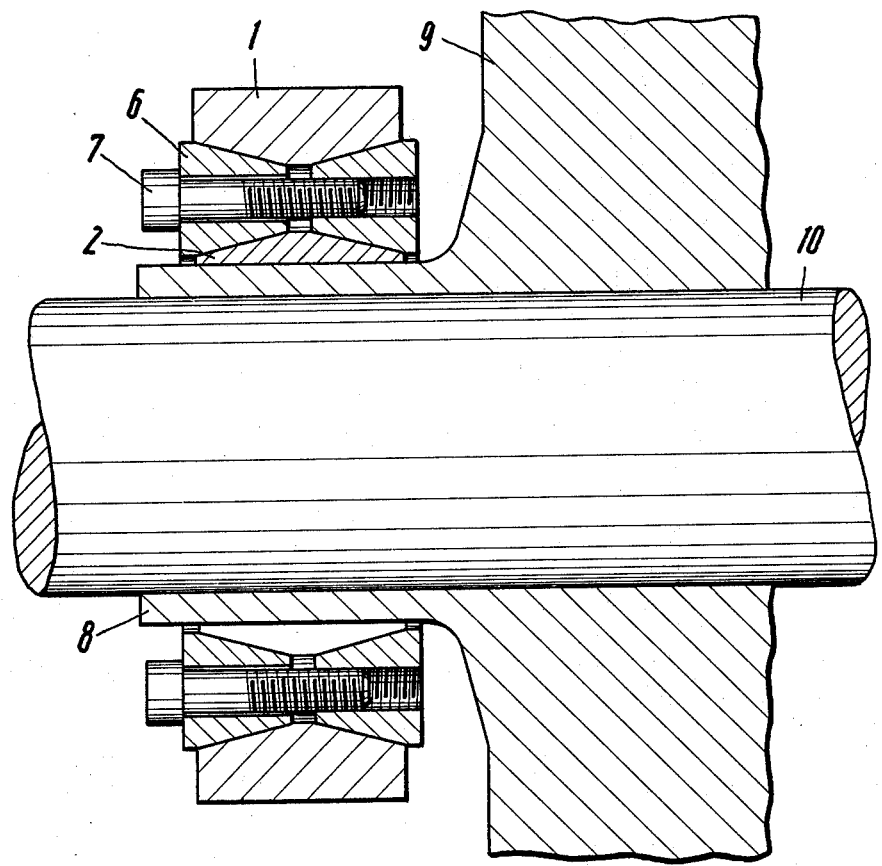
FIG. 1 is a partially sectioned view of an embodiment of the present invention.
Figure 2:
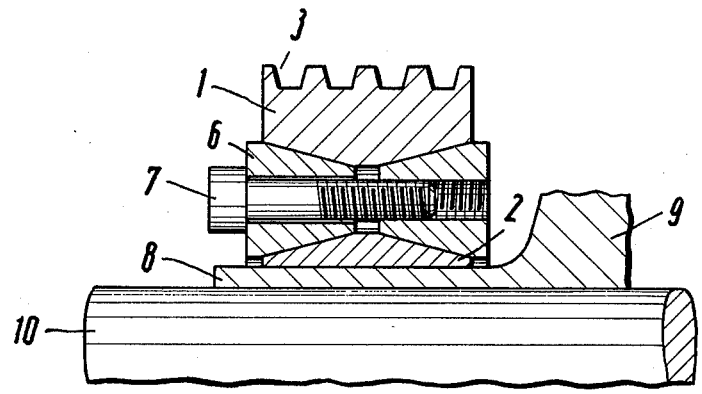
FIG. 2 is a partially sectional view of the embodiment of FIG. 1 showing a modification of the outer ring.

Discussing the apparatus which has been illustrated in an exemplary embodiment in FIGS. 1 and 2, it will be seen that reference numeral 10 identifies a rotatable element, such as a shaft, having an axis and supported in a hub 9 which has an axially extending hub sleeve attachment 8.

An inner ring 2, which may be circumferentially complete or incomplete, has a cylindrical inner circumferential surface and is sealingly mounted on the hub sleeve attachment 8. The inner ring 2 has an outer circumferential surface contoured with a pair of inclined planar wall portions. The first pair of wall portions diverge radially outwardly in double-conical configuration, that is, they diverge radially outwardly towards the opposite axial ends of the inner ring 2 as shown in FIG. 1.

An outer ring 1 has a larger diameter than the diameter of the inner ring 2 and is concentrically and radially spaced of the latter. The inner circumferential surface of the outer ring 1 is contoured with a second pair of inclined wall portions. The second pair of wall portions is the mirror-image of the first pair of wall portions. Thus, the two pairs of wall portions define with each other a pair of axially shaped annular V-shaped recesses, each of which converges inwardly in direction towards each other from one axial end of the respective rings 1, 2. The outer circumferential region of the outer ring 1 is cylindrically shaped as shown in FIG. 1, or may be modified as will be described in detail later herein.

A pair of pressure clamping rings 6 are axially spaced along a line parallel to the axis of the shaft 10 and have V-shaped surface portions which are partially received respectively in each of the V-shaped recesses.

A plurality of clamping screws 7 are circumferentially distributed on the clamping rings 6 and are operative to draw the latter together.

The leading end portions of the screws 7 are threaded and mesh with a cooperating threaded bore provided in the associated clamping ring 6. The trailing portions of the screws 7 pass with clearance through aligned bores in the other associated clamping ring 6. The screws 7 have a head portion which abuts against the last-mentioned clamping ring and is adapted to be turned by a tool in conventional manner.

In operation, turning the screws 7 in one direction causes the clamping rings 6 to be drawing together. Turning the screws 7 in the opposite direction will cause the rings 6 to separate, thus detaching the coupling device from the shaft 10.

The V-shaped surface portions will wedge against the walls of the V-shaped recesses, thus generating the radial clamping force to frictionally act initially upon the hub attachment 8 and, in turn, upon the shaft 10. The outer ring is radially expanded, and the inner ring is inwardly compressed into tight engagement with the outer surface of the rotatable shaft element 10.

The larger axial section cross-sectional area of the outer ring 1 causes a more affirmative clamping force to be realized than was obtained by the symmetrical outer and inner rings of the prior art described above. The asymmetrical rings allow the outer circumferential region of the outer ring to further comprise a drive-coupling portion. As can be seen in FIG. 1, the drive-coupling portion extends radially a greater distance than the inner ring 2 extends in the radial direction.

The outer circumferential region of the outer ring 1 is adapted to be used in many types of transmission drive systems. For example, in FIG. 1 the outer circumferential region is cylindrically shaped so that the coupling device can be coupled to a conventional belt drive system. Of course, the outer circumferential region may be smooth or roughened to increase the frictional coupling connection.

In FIG. 2, the outer circumferential region of the drive coupling portion has peripheral grooves 3 so that the coupling device can be coupled to a V-belt or screw-drive transmission system which are conventional in the art.

Figure 3:
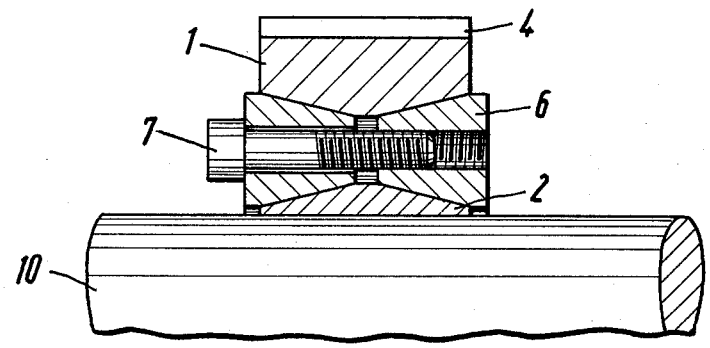
FIG. 3 is a partially sectioned view of a second embodiment of the present invention showing yet another embodiment of the outer ring.

In FIG. 3, the outer circumferential region of the drive coupling system has axially extending teeth 4 which couple the device to a conventional gear-tooth drive system. This orientation of the teeth 4 assures that the drive system is not restricted only to drive systems having rotating elements turning about a line normal to the axis of the shaft 10, but are intended to include drive systems having rotating elements turning about a line parallel to the axis of the shaft 10.

Figure 4:
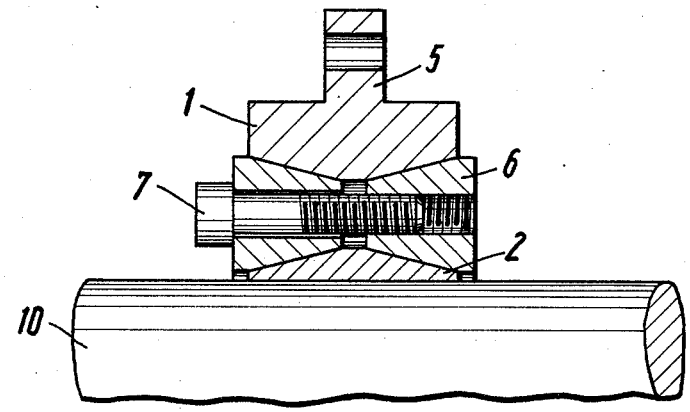
FIG. 4 is a partially sectioned view of the embodiment of FIG. 3 showing yet another modification of the outer ring.

In FIG. 4, the drive coupling portion has a flange-type ring attachment 5 which is adapted to couple the shaft to any rotatable transmission drive system.

In FIGS. 3 and 4, in contrast to FIGS. 1 and 2, the inner circumferential surface of the inner ring 2 is shown to be sealingly mounted directly on the shaft 10. In this embodiment, the radial clamping force is even more affirmative in the localized area of engagement.

In all of the embodiments, the outer rings 1 are circumferentially complete and are easily interchangeable with one another. Loosening the clamping screws 7 will reverse the wedging action and permit an outer ring to be used at another location depending upon the desired loading and required torque transmission requirements.

The rings 1, 2 are preferably made of spring steel, but other suitable materials can be used. The clamping ring 6 may be made of spring steel or of any other rigid metallic material.

It will be understood that each of the elements described above, or two or more together, may also find a useful application in other types of detachable coupling device differing from the types described above.

While the invention has been illustrated and described as embodied in a detachable coupling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of generic or specific aspects of this invention.

What is claimed as new and desired to be protected by Letters Patent is set forth in the appended claims:

1. In a detachable coupling device for transmitting high torque to a rotatable element, a combination comprising a rotatable element having an axis, said rotatable element comprising a hub having an axially-extending sleeve attachment and a shaft extending through and supported in said sleeve attachment; an inner circumferentially-incomplete ring positioned about said rotatable element and having a contoured outer circumferential surface; an outer circumferentially-complete ring having a larger diameter than the diameter of said inner ring so as to be spaced radially of the latter and having a contoured inner circumferential surface which defines with said contoured outer circumferential surface of said inner ring a pair of axially spaced V-shaped recesses converging axially inwardly towards each other, said outer ring having in axial section a larger cross-sectional area than said inner ring; a pair of axially spaced clamping rings each at least partially received in one of said recesses, each of said clamping rings having V-shaped surface portions adapted to wedge against the walls of said V-shaped recesses when said clamping rings are drawn towards each other, one of said clamping rings having bores and the other one of said clamping rings having aligned threaded bores; and a plurality of clamping screws circumferentially mounted on said clamping rings and operative to draw the latter together, said clamping screws having threaded leading portions which pass with clearance through said bores of said one clamping ring and which cooperatively mesh with said aligned threaded bores of said other clamping ring, thereby generating a radial clamping force on said rotatable element.

2. In a detachable coupling device for transmitting high torque to a rotatable element, a combination comprising a rotatable element having an axis and a hub having an axially extending sleeve attachment; an inner circumferentially-incomplete ring positioned about said sleeve attachment and having a contoured outer circumferential surface; an outer circumferentially complete ring having a larger diameter than the diameter of said inner ring so as to be spaced radially of the latter and having a contoured inner circumferential surface which defines with said contoured outer circumferential surface of said inner ring a pair of axially spaced V-shaped recesses converging axially inwardly towards each other, said outer ring having in axial section a larger cross-sectional area than said inner ring; a pair of axially spaced clamping rings each at least partially received in one of said recesses, each of said clamping rings having V-shaped surface portions adapted to wedge against the surfaces defining said V-shaped recesses when said clamping rings are drawn towards each other a plurality of clamping screws mounted circumferentially spaced from each other on said clamping rings and operative to draw the latter together, thereby generating a radial clamping force on said rotatable element; and a shaft extending through and supported in said sleeve attachment.

3. A combination as defined in claim 2, wherein said outer ring is provided with gear teeth projecting from its outer peripherical surface and adapted to be coupled to a gear drive system.

4. A combination as defined in claim 2, wherein said outer ring has an outer circumferential region constituting a drive-coupling portion.

5. A combination as defined in claim 4, wherein said drive-coupling portion has a peripheral surface which is adapted to be coupled to a belt drive system.

6. A combination as defined in claim 4, wherein said drive-coupling portion has at least one peripheral groove adapted to be coupled to a V-belt drive.

7. A combination as defined in claim 4, wherein said drive coupling portion has teeth which are adapted to be coupled to a gear drive system.

8. A combination as defined in claim 4, wherein said drive coupling portion has a flange-ring adapted to be coupled to a rotating drive system.

* * * * *